July 2, 1963

N. R. NAIL 3,096,260

TWO-STEP ELECTROPHOTOGRAPHY

Filed June 2, 1959

Nelson R. Nail
INVENTOR.

BY
ATTORNEYS

July 2, 1963
N. R. NAIL
3,096,260
TWO-STEP ELECTROPHOTOGRAPHY
Filed June 2, 1959
3 Sheets-Sheet 2
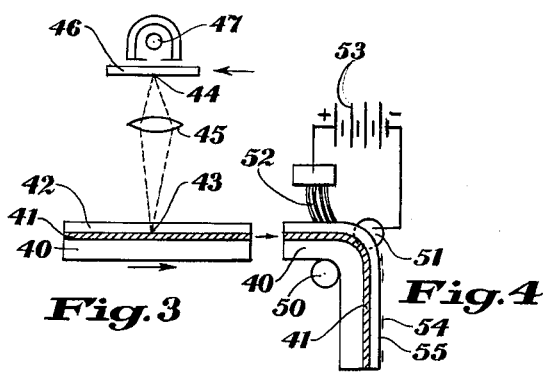
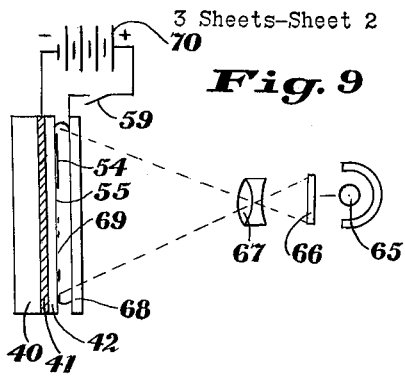
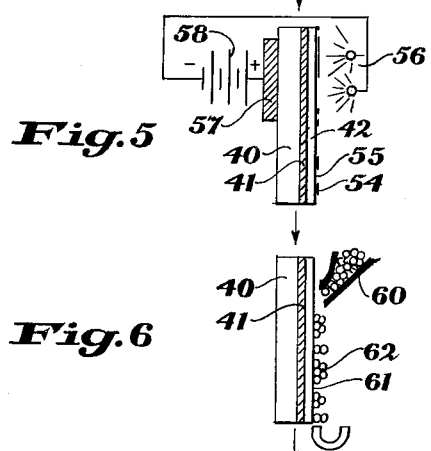
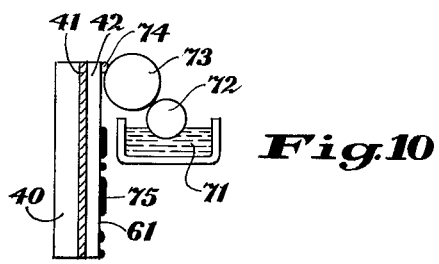
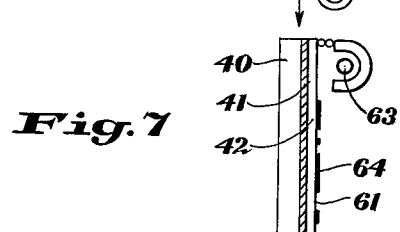
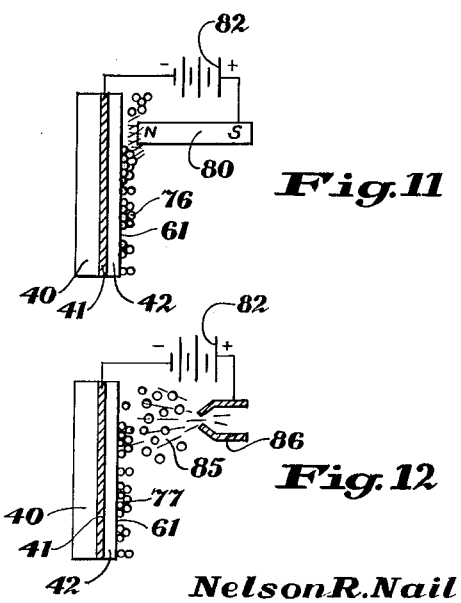
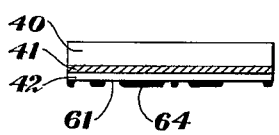
Nelson R. Nail
INVENTOR.
BY R. Frank Smith
F. M. Emerson Holmes
ATTORNEYS

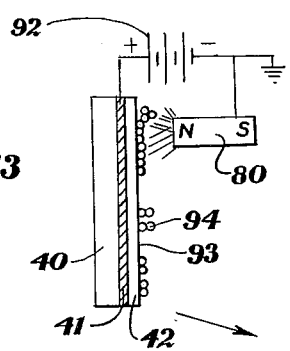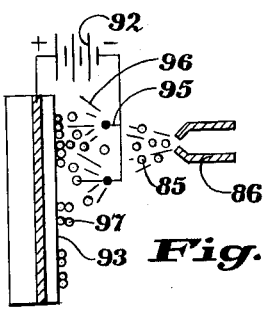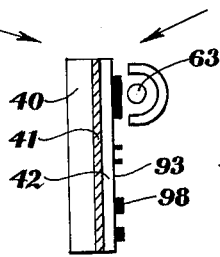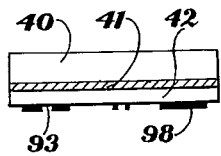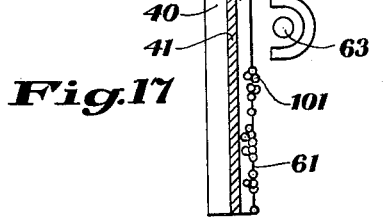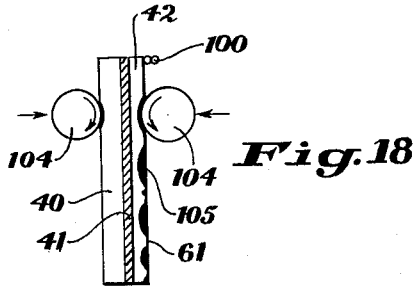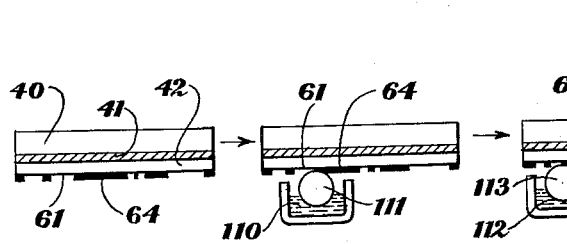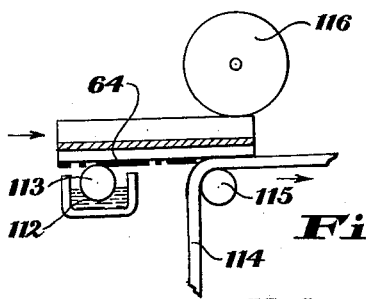

3,096,260
TWO-STEP ELECTROPHOTOGRAPHY
Nelson R. Nail, Rochester, N.Y., assignor to Eastman Kodak Company, Rochester, N.Y., a corporation of New Jersey
Filed June 2, 1959, Ser. No. 817,640
8 Claims. (Cl. 204—18)

This invenrttion relates to the making of photographic records or more exactly, since it is applicable to infrared, ultra violet and X-ray recording, to the making of radiation records.

The primary object of the invention is to overcome many of the shortcomings of photoconductography which process in some of its preferred forms is described in such patents as British 188,030, VonBronk, British 464,112 Goldman, British 789,309 Berchtold and Belgian 561,403 Johnson et al., and also to overcome the shortcomings of xerography.

As applied to the direct making of a record, the object of the invention is to provide higher contrast than that which is normally obtained with photoconductography or xerography and in a preferred embodiment to provide cleaner whites or highlights.

It is also an object of the invention to provide considerably higher speed than is normally obtained in photoconductography by a factor of 2, 4, or even 10 times.

It is an object of one embodiment to obtain these same advantages in the manufacture of a lithographic plate. In this latter embodiment a rugged lithoplate from which a large number of plates may be pulled is made quite inexpensively, but without loss of quality.

Essentially, according to the present invention, a photoconductographic print is made according to many of the known processes. However, even this step can be either greatly simplified or modified to provide added speed or any other desirable properties, since this step does not have to produce an acceptable image. In fact the image may be quite invisible or, in the litho plate embodiment, may be incapable of being used as a litho plate. For reasons set forth below the photoconductographic print must be on zinc oxide in binder rather than selenium or most of the other photoconductive materials. After this photoconductographic print is made, a system similar in many respect to xerography, but omitting the main step of the xerographic process, namely the exposure, is used. The permanent photoconductographic image is electrically charged and then developed with a xerographic toner. The toner is attracted either to the image material or to the areas not covered by the image material and is used to change the contrast of the image either by darkening the blacks or whitening the whites or is used to provide a higher difference in hydrophilicity or hydrophobicity. The toner is fixed in situ, usually by fusing or pressure although solvent or lacquer fixing may be used.

Thus, according to the invention a photoconductive layer of zinc oxide in insulating binder is exposed to an image which produces a pattern of electrical conductivity distributed image-wise. While the pattern is present, i.e. during or immediately after exposure, electric current is passed through the layer, electrolytically depositing on the layer itself, in accordance with the current, a metal or other material such that the ability to store charge is lower in areas of the zinc oxide layer covered by this material than in areas of the zinc oxide layer not covered by this material, at least when the layer is effectively dark, i.e. in the absence of radiation to which the photoconductive layer is sensitive. The term "charge-storability" will be used herein because of the way in which such zinc oxide layers operate. If an electrostatic charge is applied to selenium in the dark, it does not leak away, except extremely slowly, apparently for the simple reason that the resistance of selenium is so high that the leakage current is quite low. On the other hand the dark conductivity of a zinc oxide layer of the types commonly used in electrophotography, is somewhat higher than that of selenium, but a charge on the surface of zinc oxide sets up a barrier layer at the boundary of the zinc oxide. This is analogous to the surface or boundary effect on an electrode, the corona which produces the charge being the electrode in this case. If in some way, the charge can break through the surface barrier so that it enters the zinc oxide layer, the conductivity of the zinc oxide itself, even in the dark, is sufficient to let the charge leak away. Metal coated on the surface of the zinc oxide is adequate to provide means for overcoming the barrier. Also, and this is quite important in some embodiments, some materials which are not purely metallic and do not have high specific conductivity are still adequate to perforate the barrier and allow the charge to leak away.

It is repeated that while either selenium or zinc oxide will produce a photoconductographic image, only zinc oxide will work in the second part of the process. Harvey E. Brown in his book, "Zinc Oxide Rediscovered," published in 1957 by New Jersey Zinc Company (Library of Congress Card No. 57–43223) discussed the relative advantages of French process and American process zinc oxide. Photoconductive zinc oxide refers to French process zinc oxide in an electrically resistant binder. All of this is well known and various companies market various satisfactory grades of French process zinc oxide. Any of the well known photoconductive zinc oxides will work in the present invention.

The photoconductive layer (zinc oxide in binder) may be either light or dark and may be chosen for high speed or high resolution without regard to the acceptability of a photoconductographic image producible thereon. Similarly the photoconductographic image may be light or dark or even invisible or practically invisible on the photoconductive layer. Since the photoconductographic image will work in the present process even when on a trace of image material is deposited by plating or other electrolytic method, the effective speed during the image exposing time is greatly increased, perhaps to a full order of magnitude. The next step after the photoconductographic image has been produced, i.e. securely and bindingly deposited on the photoconductive layer, which distinguishes photoconductographic processes generally from most forms of xerography, the image is electrostatically charged by applying a corona or by one of the other methods commonly used in xerography.

At this stage the photoconductographic plate could be used for xerographic printing as described in the cofiled application by J. G. Jarvis now U.S. Patent 2, 972,304, which is a continuation in part of Serial No. 614,636 filed October 8, 1956, now abandoned. In the present invention, however, a xerographic toner is applied by any of the standard xerographic developer systems to the photoconductographic image. These standard developer systems include cloud development, cascading or magnetically brushing a powder across the surface or depositing the toner from a colloidal or other suspension in a liquid of high electrical resistance. If the toner is uncharged or is at least not charged the same as the charge on the zinc oxide surface, the toner is attracted to the charged areas of the surface between the image areas. If the toner is charged the same as the surface, it is attracted to the conducting or at least barrier-penetrating or -overcoming image. Finally the toner is fixed to the surface i.e. to the image or to the area between the image areas, by fusing or other suitable xerographic fixing methods, such as pressure, solvent or lacquer.

Example 1

Photoconductive zinc oxide in a suitable binder coated on metal foil was exposed to an image and then brushed with an electrolyte containing a silver salt; a direct current was passed between the foil and the brush so that the brush was the anode and the zinc oxide the cathode. The exposure and current density were such that the amount of silver deposited was barely visible on the zinc oxide. However, it was found to be quite sufficient to overcome the barrier layer which forms on zinc oxide when negatively charged.

Various silver salts and various other metal salts have been found to work equally well, the fact that they would electroplate being well known in electrical recording, both photoconductography and stylus recording. The finished photoconductographic print was then passed (under safelight illumination) under a wire corona to charge the surface negatively. This charge remains on the exposed surface of the zinc oxide layer, but leaks away in the areas of the electrolytically deposited image.

The invention is carried out by employing an electroscopic powder such as a mixture of 20 parts phenol-formaldehyde resin and 1 part carbon black. The electroscopic powder is prepared by mixing the above ingredients and breaking them to a 16-mesh size or smaller, after which approximately 225 grams of the mixture are placed in a one-half gallon capacity ball mill jar containing an aluminum scraper. The jar is filled to approximately three-quarters its capacity with ½″ diameter balls and the mixture ball milled for about four hours, after which it is removed from the ball mill jar and fused on a hot plate under suitable heating lamps or by other suitable means. The mixture is then cooled and broken into approximately 16-mesh size particles, following which it is micropulverized to an average size of from 1 to 20 microns. In addition, this invention is carried out with any of the commercially available electroscopic toners such as those listed later in this application.

In some cases the toner was passed through a negative corona first so as to be charged the same as the surface; such toner deposited on the metal and gave a high contrast negative image. In other cases uncharged (or positively charged) toner was used which deposited on the zinc oxide but not on the metal areas. This gave a high contrast positive image when fuzed in zitu by heating.

Example 2

This example employed the same photoconductography techniques as Example 1 except that the metal deposited was sufficient to be quite dark—a good black. It was observed that charge was stored on areas having densities up to about 0.2 or slightly higher, while at higher densities it was not stored. After the surface was charged, a light colored toner such as those described in U.S. 2,758,524, Sugarman, and in U.S. 2,856,535, Vyverberg was applied uncharged (or positively charged) so that it deposited on the low-density areas of the original image, making them whiter. This cleaned up the whites and produced a high contrast negative when fused in situ. This mode of operation is especially useful because of the very low contrast, and correspondingly long scale, and especially the very low contrast at low densities, of photoconductographic images in general.

The amount of photoconductographic image which may be usefully deposited is determined by the brightness range of the original. With originals having a large brightness range (greater than 1.0 log unit) high densities may be achieved without deposition of sufficient photoconductographic image material to prevent storage of charge in the areas of relatively lower density. Thus the contrast and maximum density of photoconductographic prints may be greatly improved. In addition, with this system the optical density of the zinc oxide layer is no longer objectionable and hence any zinc oxide binder combination which gives the desired color sensitivity, speed and resolution may be used.

Example 3

In this example a very highly optically sensitized and therefore highly colored zinc oxide layer was used. The sensitizing dye was Rose Bengal. The metal electrolytically deposited to form the photoconductographic image was not appreciably different in optical density (i.e. a difference of less than .3 unit) from the zinc oxide (for either a small or a large deposit). After charging, a white toner was applied (uncharged or charged positively) to give a high contrast (i.e. greater than .3) negative image. Alternatively, and this is a most useful embodiment of the invention, the white toner was charged negatively (i.e. the same as the surface) and deposited on the metal giving a high contrast positive image.

Example 4

In the making of a litho plate, the toner must be more hydrophobic or more hydrophilic than either the zinc oxide layer or the image material. If it were between them on the scale from hydrophobic to hydrophilic, or if it were substantially equal to either of them on the scale, the plate would be better without the toner.

Zinc oxide in resinous binders of the type commonly used in that form of xerography in which the image is formed on a non-reusable record sheet, is extremely hydrophobic. By application to such a layer of a solution of potassium ferrocyanide acidified with hydrochloric acid or of a solution of potassium ferricyanide acidified with hydrochloric acid or aluminum chloride or of a solution of ferrous chloride, these zinc oxide-resin layers may be converted to be extremely hydrophilic.

On the other hand, the toners generally used in xerography are all extremely hydrophobic and are not made hydrophilic by treatment with the conversion solutions used for making the zinc oxide binder layer hydrophilic. A toner selected from the class of hydrophobic toners, when deposited on the photoconductographic image by being charged negatively, i.e. the same as the charge on the surface, accepts greasy inks quite well, while the zinc oxide-resin (non photoconductographic image) areas, made hydrophilic by use of a conversion solution, do not accept ink. Thus a litho print negative with respect to the original copy results.

Litho prints of high quality are made from such plates which are sufficiently rugged to withstand long runs and yet inexpensive enough to be appropriate even when only a few (three or four) copies are wanted.

On the other hand, litho prints positive with respect to the original copy may be made using a method of depositing the hydrophobic toner such that toner is applied in areas not charged (not carrying photoconductographic image).

Example 5

A hydrophilic toner was made by grinding and screening aluminum silicate. This toner was applied by cascade development with glass beads and was retained in the charged-non-image-bearing areas of a photoconductographic print made as in the previous examples 1, 2 and 3, and was fixed in place by passing the print between steel pressure rollers. When wetted with a lithographic fountain solution, the print accepted ink only in the areas not carrying the hydrophilic aluminum silicate image. Thus a lithographic printing plate was made. Passing the toner through a corona to charge it positively, causes it to deposit in the non-charged image bearing areas. Thus, either positive or negative lithographic plates by this process, are made as desired.

Example 6

A photoconductographic print of very low optical density was made by exposing a zinc oxide-resin layer on aluminum foil backing to a light image and then developing a photoconductographic image with a brush wetted with a solution made by mixing immediately before use 50 ml. of a 1% aqueous solution of ferrous chloride tetrahydrate with 25 ml. of a 0.5% solution of dithiooximide in ethyl alcohol. The brush was held eighty volts positive, with respect to the aluminum backing. After drying, this print was charged and toned with a dark toner held in the charged areas. A direct positive print resulted from the retention of toner only in areas not carrying the photoconductographic image. The latter image thus overcame the barrier effect in the zinc oxide even though the image is not metallic and not highly conducting.

Other objects and advantages of the invention will be apparent from the accompanying drawings in which:

FIGS. 1 and 2 compare photoconductive zinc oxide with selenium.

FIGS. 3 to 8 constitute a flow chart schematically illustrating the various steps of a preferred embodiment of the invention.

FIG. 9 illustrates a method of producing the photoconductographic image which method is alternative to that shown in FIGS. 3 and 4.

FIGS. 10, 11 and 12 illustrate toner steps alternative to that shown in FIG. 6.

FIGS. 13 and 14 are also alternative to FIG. 6 and illustrate toning in which the toner is applied to the uncharged areas of the photoconductographic image; FIGS. 15 and 16 illustrate the fuzing and final form of an image so toned.

FIGS. 17 and 18 respectively illustrate an alternative method of fuzing and a method of fixing by pressure, either of which steps is alternative to that shown in FIGS. 7 and 15.

FIGS. 19, 20 and 21 show lithographic printing from a toned photoconductographic litho plate made according to the present invention.

There are many types of photoconductors and certain photoconductors such as zinc oxide have properties for making them useful in the present invention whereas other photoconductors such as selenium do not have these properties. In a sense, zinc oxide and selenium operate on different principles when used in electrostatic photography although, as far as ordinary electrostatic photography is concerned, this particular difference is negligible. On the other hand in the present invention, this difference, to be described in detail below, becomes all essential. Zinc oxide will work; selenium will not work.

Figure 1:
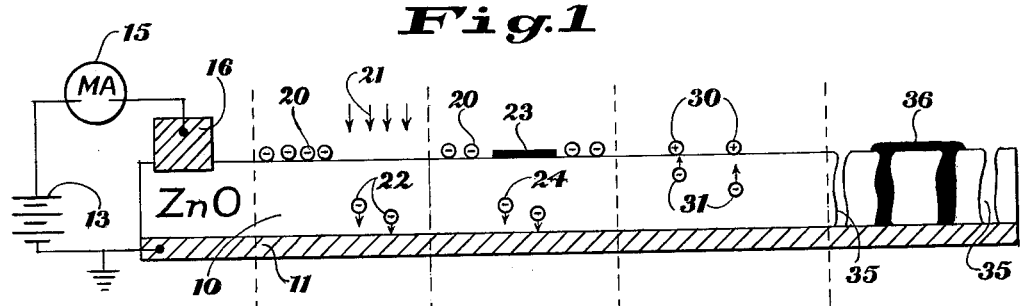
Figure 2:
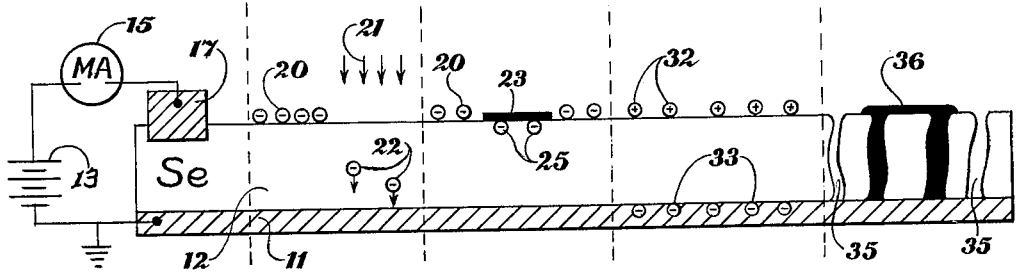

FIGS. 1 and 2 illustrate zinc oxide and selenium and both figures are divided into five areas A to E in order to compare the properties of these two materials. In FIG. 1 a zinc oxide layer 10 is coated on a grounded metal base 11 and in FIG. 2 a selenium layer 12 is coated on the grounded metel base 11. If one passes D.C. current by means of a power source 13, and an essentially ohmic electrode 16 through zinc oxide the current may be measured by a microammeter 15. An ohmic electrode is one substantially free of surface or barrier effects, the electrode 16 may be of indium for example and the electrode 17 may be of gold. The photocurrent varies with the intensity of the light falling on the zinc oxide. When dark, the specific resistance of zinc oxide is approximately $10^{10}$ ohm-cm. The same tests run with the selenium indicates that the dark specific resistance of selenium is much higher and is at least $10^{13}$ ohm-cm. The relatively low resistance of zinc oxide would indicate that an electrostatic charge placed on the surface thereof should leak away fairly rapidly even in the dark. However, as indicated in area B of the two figures negative charges 20 placed on the surface of the zinc oxide, do not tend to leak away until light or other radiation 21 falls on the zinc oxide causing the charges indicated at 22 to leak away to the ground base plate 11. The operation in the case of selenium is exactly the same.

Thus far there appears to be no essential difference in the operation of the two photoconductors except that it is surprising that the charges 20 remain on the surface of the zinc oxide as long as they do in total darkness. It is believed that the charges 20 are actually prevented by some surface or barrier phenomenon from entering into the zinc oxide. This is similar to the boundary effect found at the cathode in some electrolytic systems. In fact when the charge is produced by means of a negative corona (which is ionized air) this corona may be considered to be the cathode and the charge 20 could be considered the residual charge left on the boundary or surface after the cathode has been taken away. If, as shown in area C, an extremely thin metal layer 23, so thin that it is barely visible, is placed on the surface of the zinc oxide, this metal apparently, according to theory, penetrates or overcomes the barrier layer and prevents the formation of such a barrier layer when a negative charge is applied to the surface. Thus the negative charges 20 stay on the surface, but even in the dark, the charges 24 tend to leak away to the grounded base plate 11. In fact the barrier breaking or barrier prevention layer 23 does not even have to be metal or other highly conducting material. Certain non-conductors interfere with the formation of the barrier effect and allow the charges to enter the zinc oxide and once they are in, they leak away to the base.

In FIG. 2 the charges 20 remain on the surface and even in the area where a metal 23 allows these charges to pass through itself, i.e. through the metal 23, they remain as shown at 25 at the surface of the selenium since the selenium is in the dark; the property of selenium is purely photoconductivity or at least it does not exhibit the barrier effect observed with zinc oxide. As discussed below the overcoming of the barrier on zinc oxide by a thin metal or other material is essential to the present invention, whereas the simple photoconductivity is not so essential in the second step of the present invention although it is used in the photoconductographic step.

The distinguishing property of zinc oxide also becomes apparent as illustrated in area D, when one attempts to put a positive charge 30 on the surface of the zinc oxide. It is dissipated very rapidly since the negative charges 31 from the base plate 11 rise quickly to the surface and neutralize any positive charges even in the dark. However, in the case of selenium positive charges 32 remain on the surface since negative charges 33 in the base plate do not flow through the selenium 12 while dark. Selenium will hold either a positive or a negative charge on its surface. Photoconductive zinc oxide of the types normally used in electrophotography will hold a negative charge but will tend to lose a positive charge fairly rapidly.

Area E is included to explain why tests with some photo-conductive selenium sheets do not always behave as discussed above. If the zinc oxide layer 10 or the selenium layer 12 happens to be perforated with a multitude of small holes or cracks 35, these perforations have little effect on the charge-storage properties of the layers as long as the total area of the perforations is small compared to the area of the layer. On the other hand the application of even slightly conductive material 36 into these holes 35 and over the surface between the holes, serves to prevent charging of these material-bearing areas.

Thus perforated zinc oxide-resin or selenium layers (as shown in area E) appear to act the same as zinc oxide-resin does in area C. The present invention first produces the zinc oxide resin arrangement of area C and then uses it. The perforated coatings would interfere with the electrolytic deposition involved in producing the arrangement; the electrolyte would short circuit through the perforations. Hence perforated coatings cannot be used.

It is realized that all of this description of the phenomenon involved is purely theoretical and the theory is not relied on in connection with the present invention. However, the differences in the observed phenomena between zinc oxide and selenium are important in the present invention and the theory given here aids in understanding the phenomenon.

In addition to all of the above, selenium is itself objectionable in most photoconductography processes since it reacts with or is adversely affected by, most electrolytes commonly used.

In FIG. 3 a sheet of electrophotographic material, consisting of paper base 40 laminated to metal foil 41 and coated with photoconductive zinc oxide 42 in suitable binder, is exposed by scanning. Light from a lamp 47 illuminates a line 44 of a transparency 46 and an image of this line is focused by a lens 45 at 43 in the zinc oxide layer 42. The transparency 46 is moved, as indicated by arrows, synchronously with the photoconductive sheet.

Immediately after exposure, as illustrated in FIG. 4, the photoconductive sheet is passed over a roller 50 and the foil layer 41 is contacted at the edges by metal rollers 51. A metal backed brush 52 of electrically insulating bristles but carrying an electrolyte consisting of a solution of silver chloride and sodium thiosulfate, brushes the exposed surface of the zinc oxide layer. This provides an electroplating bath in contact with the exposed zinc oxide surface. A source of D.C. potential 53 causes the zinc oxide layer to act as a cathode and the backing of the brush acts as the anode. The areas of the layer 42 which have been rendered conducting by exposure to light, allow current to pass through the electrolyte and this causes silver to be deposited in areas 54 on the surface of the zinc oxide layer. However, areas such as 55 which have not been exposed to light as the sheet passes through the step illustrated in FIG. 3 are not conducting and no silver is plated-out on the surface. The actual amount of silver plated in areas 54 may be extremely small or alternatively may be so dense that the photoconductographic image thus formed appears to be quite contrasting. That is, for the purposes of the present invention, it does not matter whether the photoconductographic image itself is an acceptable record at this step, or not. The image 54 is bindingly attached to the zinc oxide at this stage and the sheet may be stored indefinitely before the next step of the invention. In any case the sheet should preferably be washed, but must be dry before the next step of the invention.

In the next step, as illustrated in FIG. 5, the zinc oxide layer with its photoconductographic image is charged negatively by being passed through a corona discharge. The discharge is created by electrodes 56 which are held at a very high negative potential by means of a D.C. source of potential indicated at 58, relative to the foil 41 which, due to the conductivity of the paper 40, is in effective electric contact with a backing plate 57. Due to the phenomenon discussed in connection with FIG. 1 the charge on the metal areas 54 leaks away but the charge remains in the areas 55 of the zinc oxide layer not covered with metal.

While this charge remains on the areas 55, xerographic toner is applied by any of the usual methods such as illustrated in FIGS. 6, 10, 11, 12, 13 or 14. In FIG. 6 a xerographic toner 60 in the form of a tribo-electrically charged powder is cascaded along with glass beads across the charged surface to adhere in certain areas or to fall into a bin for re-use. The powder does not adhere to the areas 61 from which the charge has leaked away but does adhere as shown at 62 to the charged areas of the zinc oxide layer. The toner may be light or dark or hydrophobic or hydrophilic as discussed in detail elsewhere in this specification. It should be noted that the step illustrated in FIG. 6 or the alternative toner steps are not xerographic development in the usual sense since they are not developing an image caused directly by exposure of a photoconductive layer. In fact the layer is uniformly dark (i.e. under safelight) and not recently exposed in the steps shown in both 5 and 6. In the toning step illustrated in FIGS. 6 and 12, auxiliary electrodes may be used near the surface of the zinc oxide layer to allow deposition of toner over larger areas. However, as is well known, without such electrodes the steps shown in FIGS. 6 or 12 allow the powder to deposit so as to outline each charged area.

After toning, the image is fuzed as shown in FIG. 7, by passing under a heat lamp 63, the fuzed toner being shown at 64 permanently attached to the zinc oxide layer. The finished print or plate is shown in FIG. 8. In the case where the metal coating 54 is barely visible and the fuzed toner 64 is dark, one has a positive image of the original transparency 46. That is, light areas in the original 46 appear as light areas 61 in the final print. On the other hand if the metal 54 is deposited to a high optical density and the toner 64 is light colored, one has a negative print of the original record 46. In this latter embodiment, the toner 64 serves primarily to whiten the highlights of the photoconductographic record formed in FIG. 4.

The persistence of conductivity in the zinc oxide permits the post exposure development of FIG. 4. However, in standard photoconductographic systems such as illustrated in FIG. 9 the electrolytic development may take place during exposure. Light from a lamp 65 in a projection printer illuminates a transparency 66 and is focused by a lens 67 to form an optical image in the photoconductive layer 42. As it arrives at the photoconductive layer 42, the light passes through a transparent electrode 68 and an electrolyte 69. This sandwich is not sensitive until a high D.C. potential from a source indicated at 70 is applied by closing a switch 59 across the sandwich between the electrodes 68 and 41. The switch 59 remains closed until the metal or other barrier penetrating material 54 is deposited in the desired amount on the zinc oxide layer 42. Obviously when only a very small amount of material 54 is desired, the time of exposure and electrolytic development may be quite short. This constitutes an effective increase in speed in the photoconductographic step of the present invention. The photoconductographic print is the same as that obtained from FIG. 4 and the remainder of the steps in the process may be identical.

Various methods of toning xerographic images are well known and any of these methods may be used in the present invention. For example so called liquid development may be used as illustrated in FIG. 10. An insulating liquid 71 such as carbon tetrachloride or kerosene carrying a colloidal suspension of toner and a small amount of binder is applied by means of rollers 72 and 73 to form a liquid bead 74 in contact with the charged zinc oxide layer carrying the photoconductographic image. This causes the suspended toner to adhere to the exposed zinc oxide area but not to adhere to the metal image areas 61. The toner 75 in general is then held on the zinc oxide 42 by the binder without further fixing, when such liquid development is used, but the fusing step is still commonly used to harden the toner.

Another common method of applying toner is shown in FIG. 11 in which a magnetic brush 80, held positive with respect to the metal foil 41 by means of a D.C. potential source 82 applies the toner 76 which in this case contains a ferromagnetic material. Contact to the metal foil 41 in practice is easily made through the paper and a backing plate similar to that shown in FIG. 5. Cloud development as illustrated in FIG. 12 is similarly applicable, the powder cloud 85 being produced from a jet orifice 86.

In FIGS. 6, 10, 11 and 12 the toner is either uncharged or is charged oppositely to the charge on the zinc oxide. It is noted in xerography that if the toner is charged the same as the xerographic image, the toner will adhere to the uncharged area of the image and will be repelled by the charged area. This is also true in the present case in which the xerographic image is replaced by the charged zinc oxide layer carrying a metal image. The application of negatively charged toners is illustrated in FIGS. 13 and 14. In FIG. 13 the magnetic brush 80 is held at high negative potential relative to the metal foil 41 by means of a D.C. source 92. For safety reasons, the brush 80 is grounded and the metal foil 41 is at a high positive potential relative to the brush. The toner does not adhere to the charged zinc oxide in areas 93 but does adhere to the uncharged metal in areas 94. Cloud development with negatively charged toner is obtained by having high negative potential electrodes 95 producing a corona 96 in the cloud 85 as shown in FIG. 14. In either case, after fusion under an infrared lamp 63 as shown in FIG. 15 the toner adheres in areas 98 but is absent from areas 93 of the print. Such a print, as shown in FIG. 16 is negative relative to the record 46 (FIG. 3) or 66 (FIG. 9) when the toner is dark and the zinc oxide is light.

It sometimes happens that one wishes to use a toner which does not fuze easily, i.e. high melting toner. The known alternatives such as applying a solvent or a lacquer have disadvantages particularly if the final print is to be used as a lithographic plate which is the embodiment of the present invention most likely to require a high melting point toner. In such case two other methods of fixing the toner image have been found quite satisfactory. In FIG. 17 the binder for the zinc oxide layer 42 has a lower melting point than the toner 100. Heat from the lamp 63 softens the zinc oxide layer and the toner is fuzed into this layer as shown at 101 although the toner itself has not melted. Alternatively a high speed system of fixing uses polished or chrome plated pressure rollers 104; the toner 100 is pressed into the zinc oxide layer as shown at 105. At the same time a gloss or calendering effect is obtained on the surface of the zinc oxide itself. This has been found to be a most satisfactory method of fixing the toner image. The pressure has to be fairly high but it has been found that the toner does not tend to adhere to chrome plated rollers for example and thousands of prints have been run without even cleaning the roller, but of course a simple felt brush could be used if it were ever found necessary to keep the roller clean.

FIGS. 19 to 21 simply illustrate lithographic printing from a plate in which the toner 64 and the area 61 not covered by toner differ in their hydrophobicity. For example the toner 64 may be hydrophobic and the area 61 having metal thereon hydrophilic. Water 110 is applied by roller 111 to moisten the hydrophilic areas to reduce any tendency to attract greasy ink and then greasy ink is applied by roller 113 to the hydrophobic area. The ink plate is then passed between a roller 115 and drum 116 into contact with a roll of paper 114. Alternatively the paper may be fed from sheets and the plate may be wrapped around the drum 116 to give a large number of prints from the same plate. The plate is normally re-inked as the drum 116 rotates. Standard short-run lithopresses are quite satisfactory for this purpose and no particular type of lithoprinting is peculiar to the present invention.

I claim:
1. The method of recording a radiation image by use of a photoconductive layer containing photoconductive zinc oxide in an insulating binder comprising

(a) establishing in said layer an imagewise distributed pattern of electrical conductivity,
(b) electroplating onto one surface of said layer in conformity with said pattern a material selected from the group consisting of electroplatable metals and iron dithioximide, by passing an electric current through the layer while the conductivity pattern is present and while said one surface is in contact with an electrolyte containing in solution a material selected from the group consisting of ions of said metals and ferrous chloride tetrahydrate with dithioximide,
(c) applying a negative electrostatic charge to said surface bearing the imagewise distributed electroplated material, such application being carried out with the surface substantially dry and in the absence of radiation to which the said layer is sensitive,
(d) imagewise toning said charged surface by applying xerographic toner thereto and
(e) fixing the toner to the surface.

2. The method according to claim 1 in which the amount of material electroplated onto said surface is less than that which would be distinctly visible on the surface.

3. The method according to claim 1 in which said photoconductive layer is light colored, the material electroplated onto said surface is also light colored in the amount electroplated, and the toner is dark colored.

4. The method according to claim 1 in which the toner is not charged the same polarity as the surface and adheres to the areas of the surface not bearing the electroplated material.

5. The method according to claim 1 in which the toner is charged the same as the surface and adheres to the electroplated material.

6. The method according to claim 1 in which the photoconductive layer is dark colored, the electroplated material in the amount electroplated differs in reflection density from the layer by less than .3 unit and the toner is light colored giving contrast greater than .3.

7. The method according to claim 1 in which the toner is substantially more hydrophobic than the layer and the electroplated material.

8. The method according to claim 1 in which the toner is substantially more hydrophilic than the layer and the electroplated material.

References Cited in the file of this patent

UNITED STATES PATENTS

| | | |
|---|---|---|
| 2,877,284 | Schultz | Mar. 10, 1959 |
| 2,914,403 | Sugarman | Nov. 24, 1959 |
| 3,005,707 | Kallmann et al. | Oct. 24, 1961 |

FOREIGN PATENTS

| | | |
|---|---|---|
| 151,971 | Germany | Dec. 28, 1902 |
| 464,112 | Great Britain | Apr. 12, 1937 |
| 215,754 | Australia | June 23, 1958 |

OTHER REFERENCES

Television, vol. 1, No. 1, June 1928, page 20. Published by Experimental Publishing Co.